(12) United States Patent
Yadegar

(10) Patent No.: US 7,451,738 B2
(45) Date of Patent: Nov. 18, 2008

(54) TURBOCOMBUSTION ENGINE

(75) Inventor: Jerry Iraj Yadegar, Los Angeles, CA (US)

(73) Assignee: Perfect Motor Corp.

( * ) Notice: Subject to any disclaimer, the term of this patent is extended or adjusted under 35 U.S.C. 154(b) by 0 days.

(21) Appl. No.: 10/854,724

(22) Filed: May 25, 2004

(65) Prior Publication Data
US 2005/0263128 A1    Dec. 1, 2005

(51) Int. Cl.
F02B 53/04     (2006.01)
F02B 57/00     (2006.01)

(52) U.S. Cl. ...................... 123/226; 123/227

(58) Field of Classification Search ......... 123/223–229, 123/43 R, 18 R
See application file for complete search history.

(56) References Cited

U.S. PATENT DOCUMENTS

| | | | | |
|---|---|---|---|---|
| 897,260 A * | 8/1908 | Luther | | 123/226 |
| 1,065,410 A * | 6/1913 | Voiles | | 123/226 |
| 1,300,036 A * | 4/1919 | Smith | | 123/224 |
| 1,607,505 A * | 11/1926 | Bentley | | 123/226 |
| 2,127,016 A * | 8/1938 | Voiles | | 123/226 |
| 2,146,877 A * | 2/1939 | Appleton | | 123/226 |
| 2,189,728 A * | 2/1940 | Daniels | | 123/226 |
| 2,392,211 A * | 1/1946 | Zorich | | 123/226 |
| 3,118,432 A * | 1/1964 | Peterson | | 123/226 |
| 3,175,360 A * | 3/1965 | Lane | | 123/226 |
| 3,529,909 A * | 9/1970 | Klover | | 123/229 |
| 3,721,218 A * | 3/1973 | Null | | 123/227 |
| 4,166,438 A * | 9/1979 | Gottschalk | | 123/43 R |
| 4,617,886 A * | 10/1986 | Mach | | 123/223 |
| 4,996,953 A * | 3/1991 | Buck | | 123/51 A |
| 5,181,490 A * | 1/1993 | Ruzic | | 123/226 |
| 5,220,893 A * | 6/1993 | Costa | | 123/226 |
| 5,582,090 A * | 12/1996 | Poschl | | 91/197 |
| 6,796,285 B2 * | 9/2004 | Karnes | | 123/18 R |
| 6,928,965 B2 * | 8/2005 | Teufl | | 123/18 R |
| 2004/0035384 A1 * | 2/2004 | Moe | | 123/228 |
| 2005/0109294 A1 * | 5/2005 | Wondergem et al. | | 123/44 R |
| 2006/0174847 A1 * | 8/2006 | McLachlan | | 123/18 R |

FOREIGN PATENT DOCUMENTS

WO    WO 8301091 A1 *    3/1983

* cited by examiner

Primary Examiner—Thai-Ba Trieu

(57) ABSTRACT

A Turbocombustion engine for conversation of combustible fuel to rotating energy includes a cylinder, piston, connecting rod and crankshaft system for suction and compression and a rotor for expansion and exhaust. Combustible fuel is compressed within a combustion chamber separate from the cylinder and the combustion force applied directly to the rim of the rotor as in turbines with much larger capacity than the cylinder, converting the entire combustion force at maximum torque to rotating energy. The combustion chamber also includes a variable compression ratio system that constantly adjusts the compression ratio within the combustion chamber for optimum performance of the engine under all variables.

36 Claims, 19 Drawing Sheets

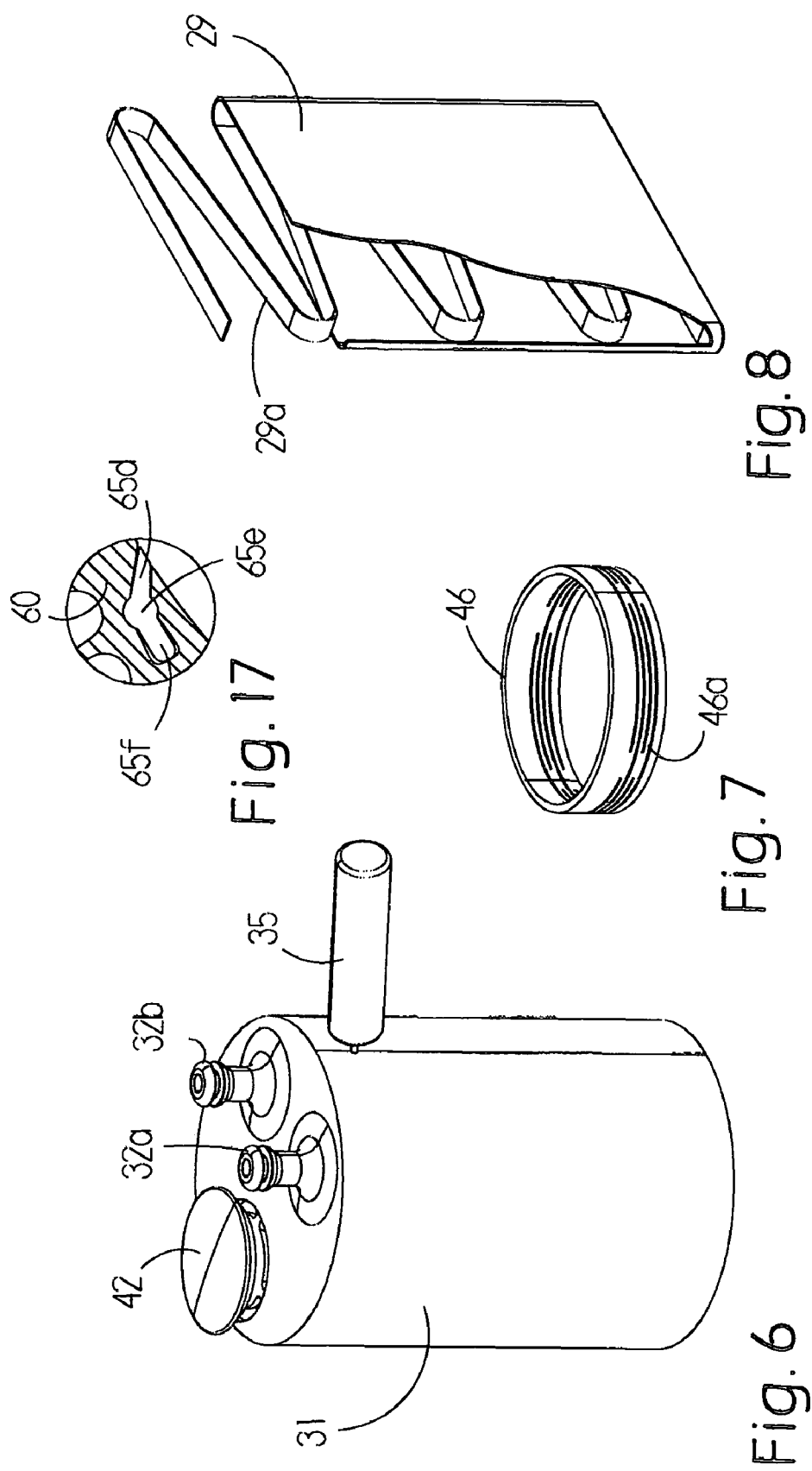

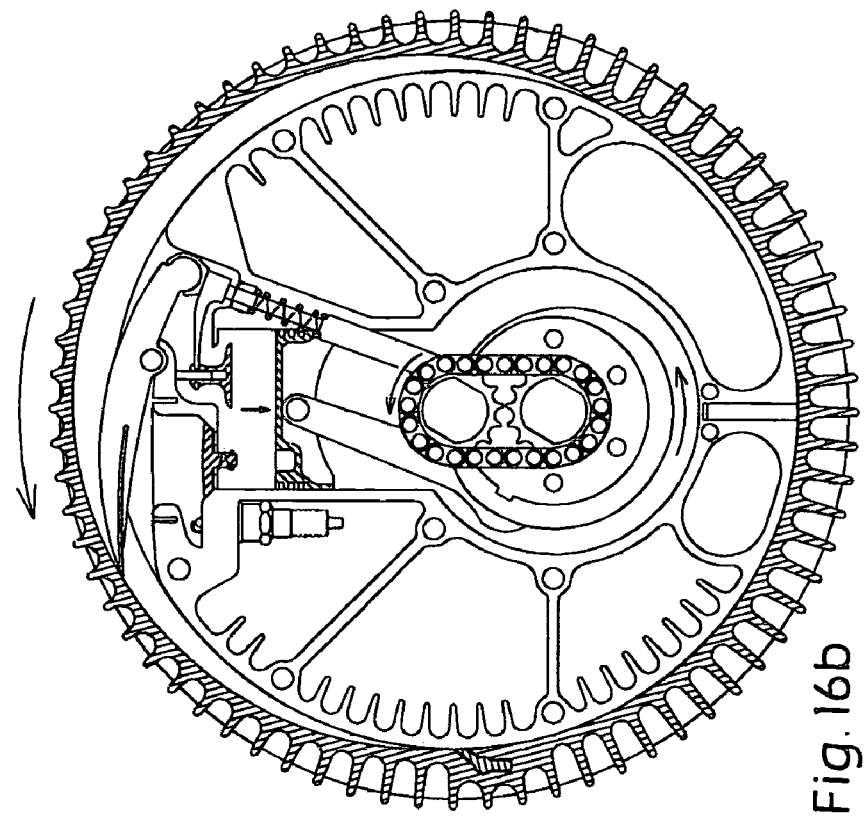
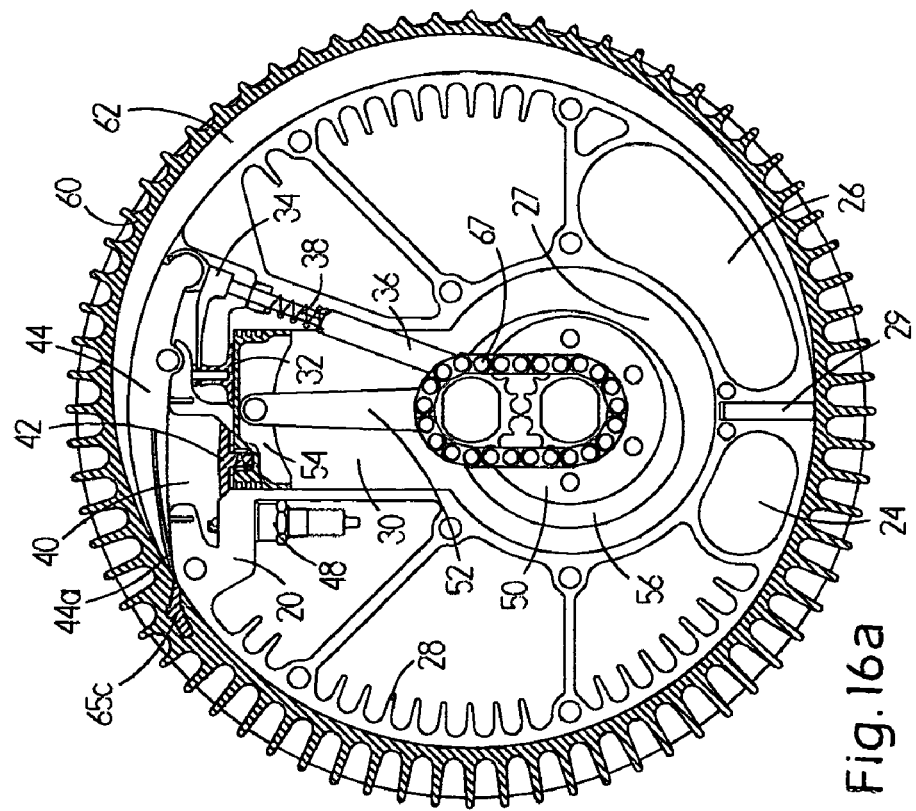
Fig. 16a
Fig. 16b

TURBOCOMBUSTION ENGINE

FIELD OF THE INVENTION

The present invention relates to engines for conversion of combustion force to rotating energy.

BACKGROUND OF THE INVENTION

Combustion of air/fuel mixture for production of rotating energy is well known in reciprocating internal combustion engines, rotary engines and many others. Beside stoichiometry, what distinguishes one engine from the other mechanically is the system by which air enters the engine, fuel is injected, air/fuel mixture is compressed, the compression ratio is adjusted, the compressed air/fuel mixture is ignited and the combustion force converted to rotating energy.

Matters effecting the suction cycle the most include the time allowed for air to flow in assuming the air throttle is wide open. In a typical reciprocating internal combustion engine for example, it takes 0.03 second at 1,000 RPM (Round-Per-Minute) for air to be sucked inside the cylinder, 0.01 second at 3,000 RPM, 0.006 second at 5,000 RPM and so on. Less time signifies less air-intake, less relative air to fuel ratio, less compression ratio, less combustion force and incomplete burning of fuel that leads to more pollution. The problem worsens at higher elevations as the atmospheric pressure becomes less intense. It is well known that fuel-lean running (use excess air) or turbo charging improves the efficiency if the air/fuel ratio by mass is stoichiometric but turbo charging requires extra sets of turning mechanism that not only contribute to further engine complications but also add more weight and slow down the free flow of exhaust.

On the other hand, the entire notion of suction and expansion within the limitation of a cylinder capacity is incorrect regardless of the engine type. At the expansion cycle, the air mass increases rapidly to a much larger volume, thus, if there is not enough room to take full advantage of the expansion force, a significant portion of it is wasted to the atmosphere. The loud noise that comes out of the exhaust port in any type of engine is the indication of such waste. It is quite clear that the inefficiency of internal combustion engines, regardless of the engine type, may never be solved unless full advantage of the expansion force is achieved.

Another problem is the torque, when the expansion force is converted to rotating energy. The ideal situation of highest torque is to apply the expansion force to the rim of a turning wheel at the direction tangential to the wheel circumference. This milestone is yet to achieve in an engine design.

Another problem is the knock or auto-ignition of compressed air/fuel mixture due to heat and excess compression. Engines are limited in their efficiency by the inability of the fuel to smoothly burn in high compression ratio. A variable compression ratio system is to calibrate compression to meet all variations including heat, atmospheric pressure, fuel type and so forth to optimum performance of the engine.

One other problem is the throw that occurs at exhaust cycle. As a piston and connecting rod move from the bottom death center toward the top dead center, they gather momentum. At the compression cycle because of the trapped air/fuel above the piston, such momentum is neutralized, but at exhaust cycle since there is no resistance over the piston, the centrifugal force particularly at higher RPMs increases the weight of the piston and connecting to such high level that create a major drag against rotation of the crankshaft. Reducing the weight of pistons and connecting rods have diminished the problem to certain extent but since the weight cannot be reduced to zero, the problem will never be solved in the existing engine designs.

When a great portion of the combustion force is not converted to rotating energy, it is converted to heat, heat of such magnitude that can easily burn the engine if not cooled down. Cooling the engine requires a cooling system consisting of double layer engine block, radiator, water pump and so forth that needs additional energy to function, not to mention their contribution to the weight of the engine.

When it comes to suction and compression however, the well-known cylinder, piston connecting rod and crankshaft system is found to be the most reliable and efficient pumping method ever tested.

SUMMERY OF THE INVENTION

By taking advantage of the cylinder, piston, connecting rod and crankshaft system reliability and effectiveness for suction and compression, constant adjustment of compression ratio, taking full advantage of expansion force by applying it at maximum torque directly to the rim of a rotor and in a much larger capacity setting than the cylinder, neutralizing centrifugal forces and eliminating the cooling system, the Turbocombustion engine of the present invention is to deliver a reliable, efficient and low weight to power ratio system by which the combustion force at its optimum level is fully converted to rotating energy and with the use of environmentally friendly fuels as well, including but not limited to alcohol, natural gas, ethanol, fuel-cell and so forth, also with low or no pollution.

The preferred embodiment of the present invention is given by way of example only, various modifications within the scope, capacity and principles of the present invention will become apparent to those skilled in the art from the detailed description given below.

BRIEF DESCRIPTION OF THE DRAWINGS

FIG. 6 is perspective view of the cylinder shell and its relation with the cylinder-valves, the combustion chamber-valve and a fuel injector.

FIG. 7 is a perspective view of the combustion chamber seal and the cuts.

FIG. 8 is a perspective and sectional view of the partition and its spring.

FIGS. 16a and 16b illustrating a turbocombustion engine having a chain drive connecting the rotor to the crankshaft and the harmonious rotation of the two.

FIG. 17 is a front view of the rotor's lateral seal illustrating different parts of the seal.

REFERENCE NUMBERS

Figure 1:
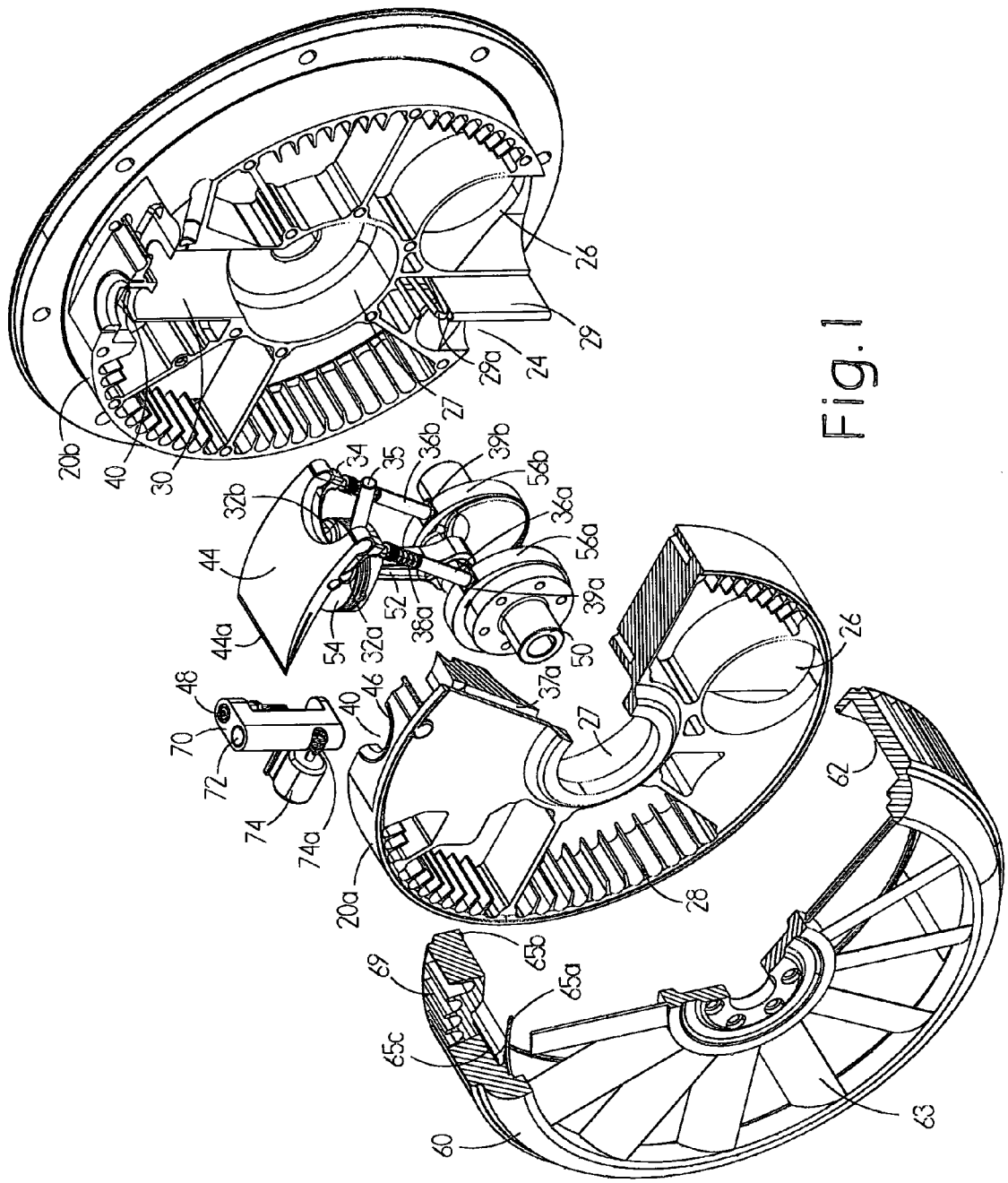
FIG. 1 is a perspective partially sectional and exploded view of the turbocombustion engine including the VCR system.

10. Turbocombustion Engine
20, 20a, 20b. Housing
22. Ring Seal
24. Exhaust Port
26. Intake Port
27. Oil Compartment
28. Paddle
29. Partition
29a. Partition Spring
30. Cylinder
31. Cylinder Shell
32, 32a, 32b. Cylinder-valve
34. Cylinder-valve Support
35. Fuel Injector
36, 36a, 36b. Camshaft
37, 37a, 37b. Camshaft Cylinder
38. 38a 38b. Expansion Spring
39, 39a, 39b. Shoes
40. Combustion Chamber
42. Chamber-valve
44. Cap
44a. Cap Seal
46. Chamber Seal
46a. Chamber Seal Cuts
48. Spark means
50. Crankshaft
52. Connecting Rod
54. Piston
56, 56a, 56b Cam
60. Rotor
62. Channel
63. Radiating paddles
64 Independent Channel Assembly
65a, 65b. Ring Seals
65c, 65d, 65e, 65f. Lateral Seal
66. Support Channel
66a, 66b. Support Channel Ring-seals
66c. Support Channel Lateral Seal
67 Chain Drive
68a, 68b. Gears
69. Rotor Paddles
70. Variable Compression Ratio (VCR) System
70a. VCR Cylinder
70b. VCR Tread
72. VCR Shaft
72a. VCR Piston
72b. VCR Bolt
72c. VCR Gear
74. Electric Motor
74a. Worm Gear
75. Multi Channel Rotor
76. Common Crankshaft

DETAILED DESCRIPTION OF THE INVENTION

Figure 9:
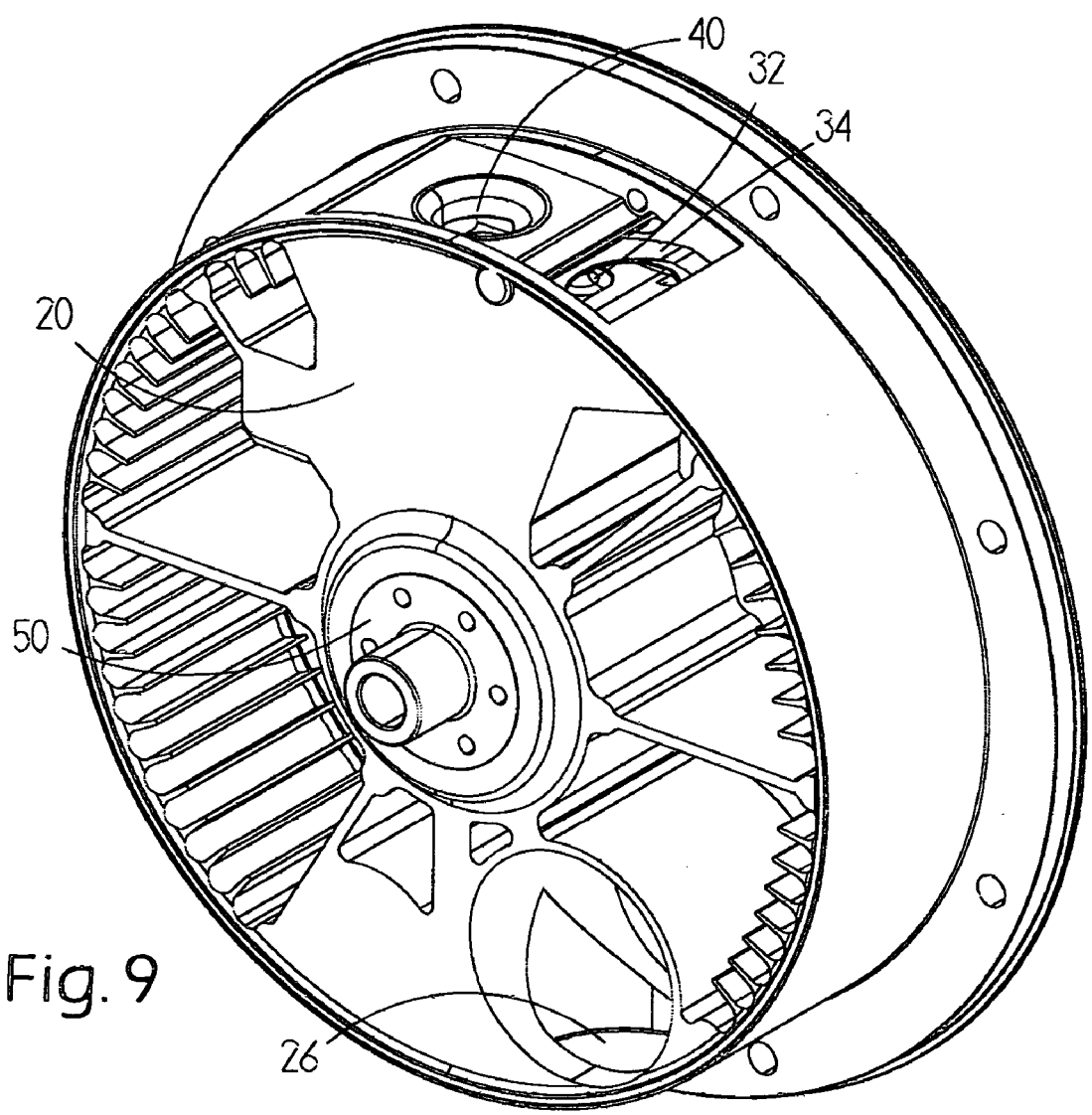
FIG. 9 is a perspective front view of the housing and its relation with the combustion chamber, crankshaft, intake port, the cylinder-valve and the valve support.
Figure 10:
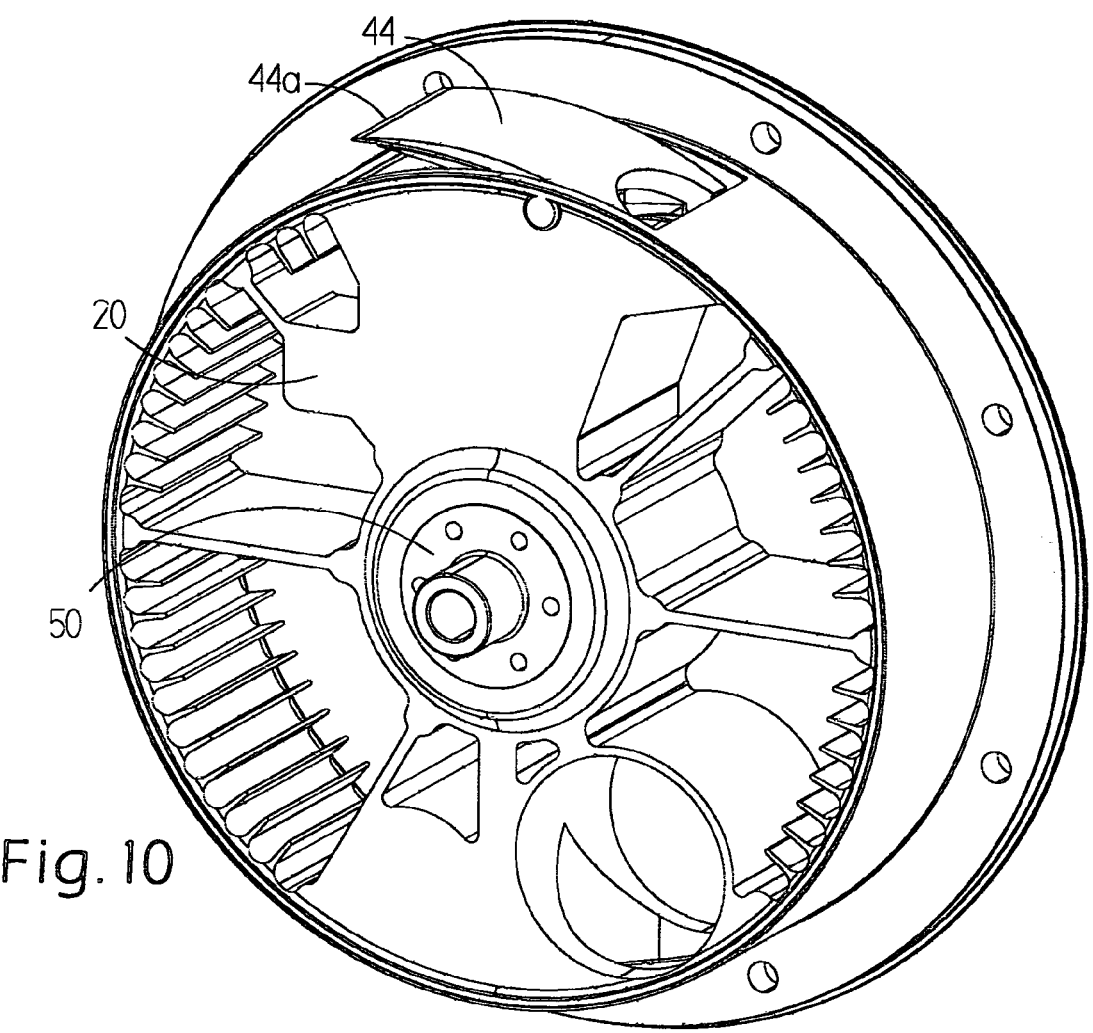
FIG. 10 is a perspective front view of the housing and its relation with the cap pivotally opened.
Figure 18:
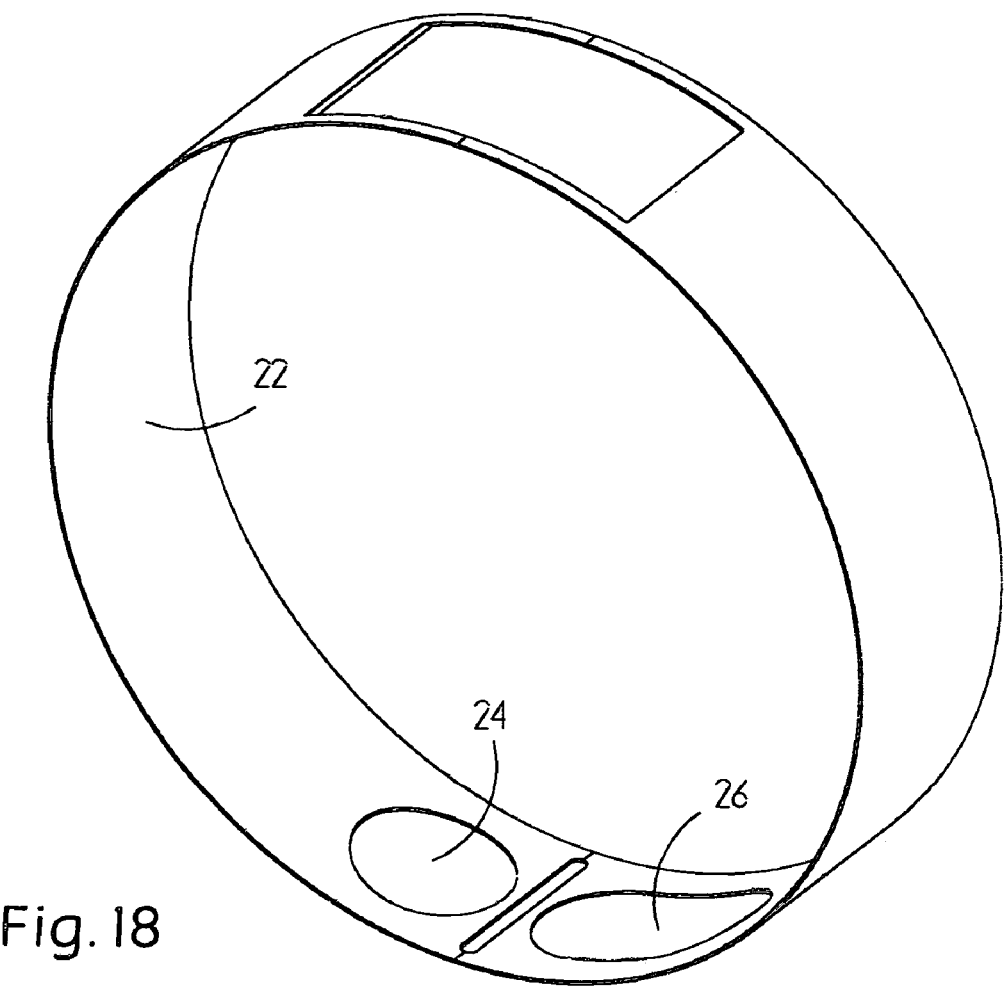
FIG. 18 is a perspective view of a housing ring seal

A Turbocombustion Engine 10 as shown in FIGS. 1, 9 and 10, includes a housing 20. Said housing 20 is consisting of a cylinder 30 and a combustion chamber 40 separated from the cylinder 30. Said housings 20 may also include a plurality of paddle 28 to air-cool and as show in FIG. 18, a ring seal 22 to seal the housing 20. The Turbocombustion engine 10 as shown in FIGS. 1, 3, 4 and 11, furthermore includes a crankshaft 50 rotatively held in place by the housing 20, a connecting rod 52 pivotally connected to the crankshaft 50 from one end and pivotally connected to a piston 54 from the other end. Said piston 54 is to reciprocate within said cylinder 30 by rotation of the crankshaft 50. The housing 20 may as well include an oil compartment 27 for lubrication purposes. The Turbocombustion engine 10 as shown in FIGS. 1, 2, 11 and 12, furthermore includes a rotor 60. Said rotor 60 is either fixedly attached to the crankshaft 50 or formed and positioned to rotate in harmony with the crankshaft 50 by a proper means either at the same or opposite direction.

The cylinder 30 includes at least one cylinder-valve 32 to allow one-way flow of intake to the cylinder 30. Opening and closing of the cylinder-valve 32 is controlled by a valve support 34 fixedly or slidably attached to said cylinder-valve 32. Said valve support 34 is attached to a camshaft 36 that is slidably reciprocating within a camshaft cylinders 37. An expansion spring 38 is to urges the camshaft 36 toward the crankshaft 50. Said camshaft 36 may include a shoe 39 fixedly or pivotally attached to the end of the camshaft 36.

The crankshaft 50 includes a cam 56 rotatively engaged said crankshaft 50 to control the reciprocating motion of the camshaft 36. The shoe 39 is to support sliding of the camshaft 36 over the cam 56.

Figure 3:
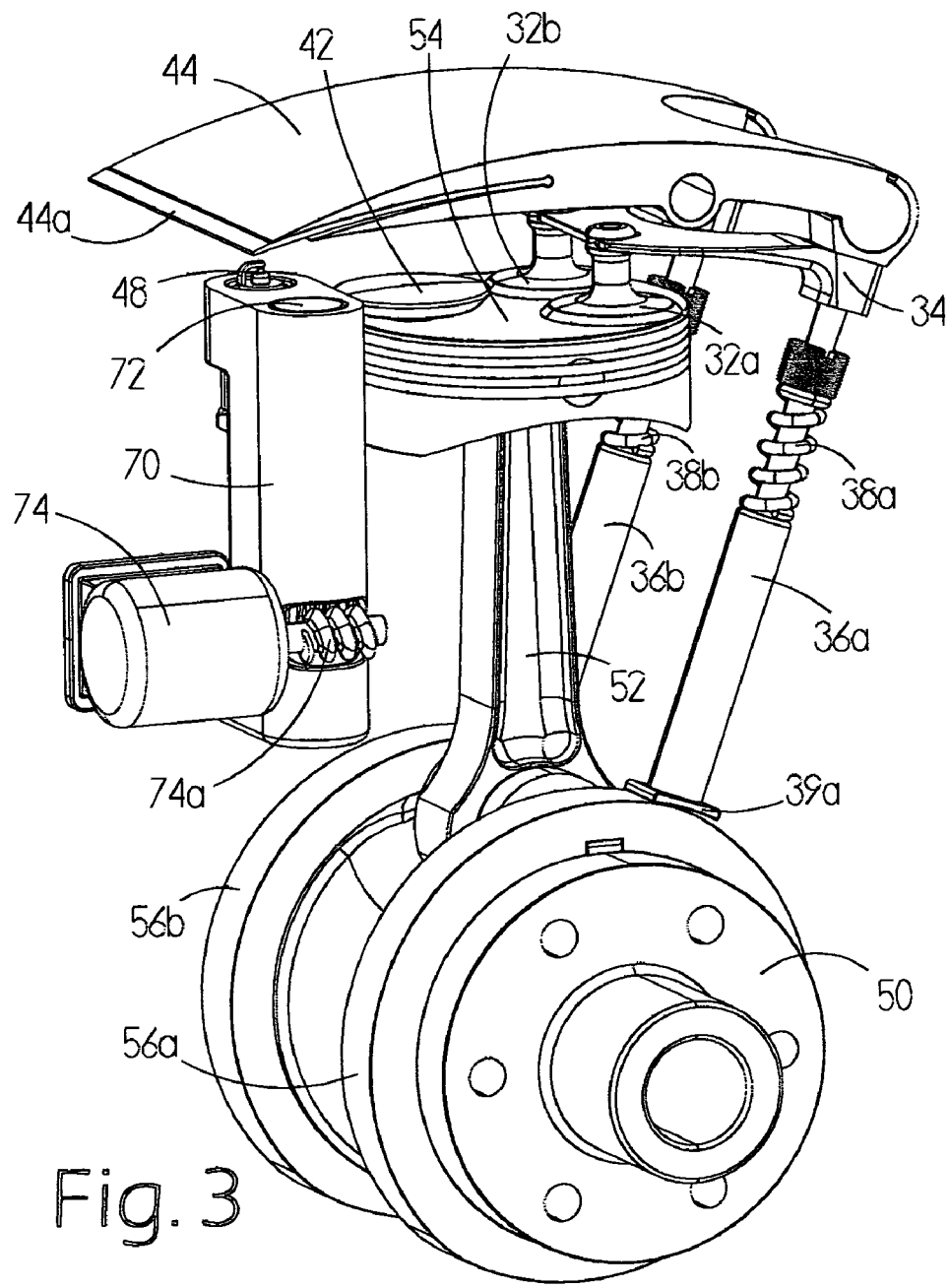
FIG. 3 is a perspective view of the inner parts of the turbocombustion engine including the VCR system showing the cap and cylinder-valves are closed.

To improve the engine 10 overall performances and enhance its balance, certain parts thereof may be made and put in place in pairs. Said parts as shown in FIGS. 1, 3 and 4 include a pair of cams 56a and 56b, a pair of shoes 39a and 39b, a pair of camshafts 36a and 36b, a pair of expansion springs 38a and 38b and a pair of cylinder-valves 32a and 32b.

The combustion chamber 40 as shown in FIGS. 3, 4 6 and 11 includes a chamber-valve 42 to allow one-way flow of the cylinder 30 content to said combustion chamber 40. Said combustion chamber 40 furthermore includes a cap 44 that closes the combustion chamber 40 and as shown in FIG. 7 a chamber seal 46 that seals the combustion chamber 40 when the cap 44 is closed. Said chamber seal 46 may have cuts 46a of proper geometry to create slight bouncing capabilities for proper seal of the chamber 40 when the cap 44 is closed.

Figure 4:
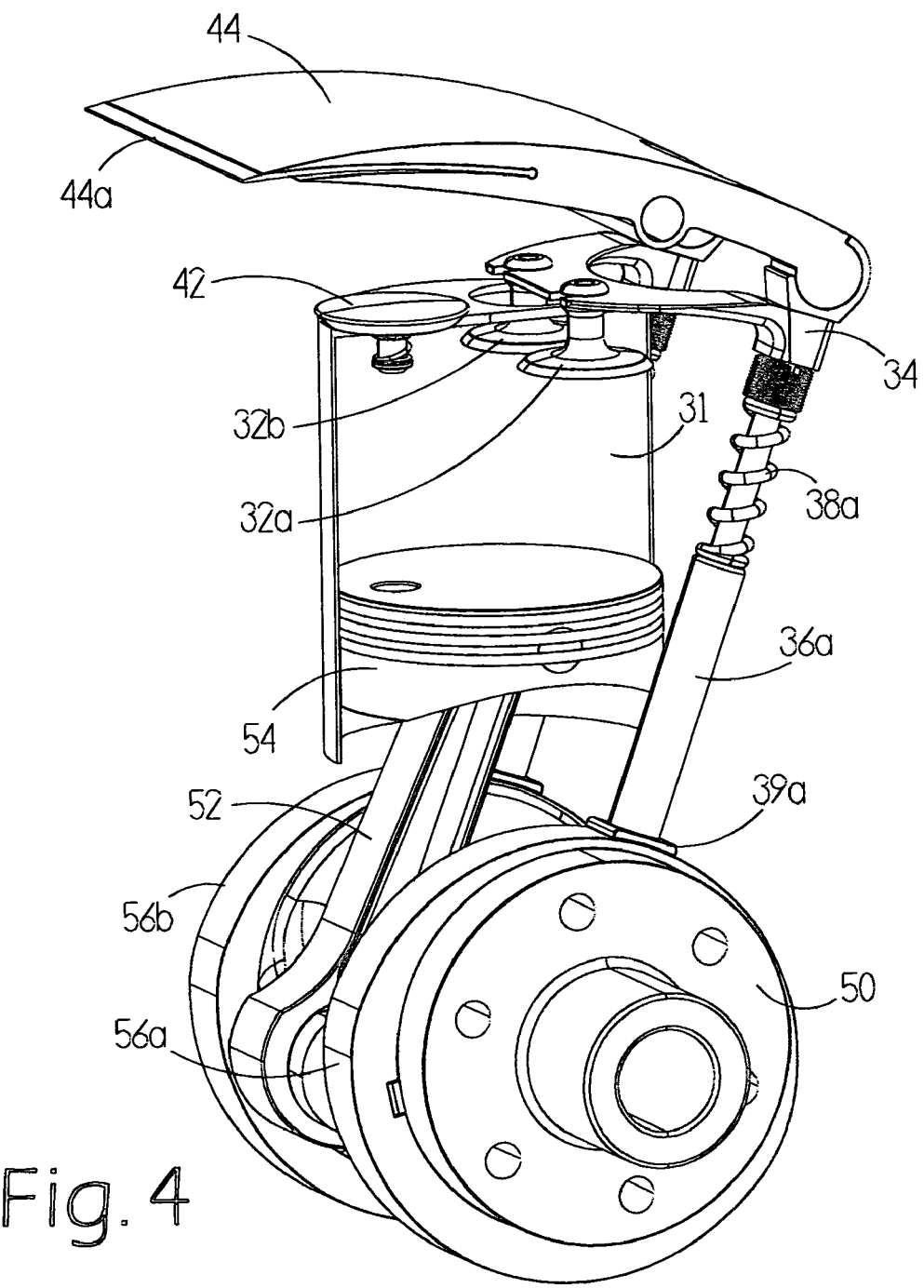
FIG. 4 is a perspective view of the inner parts of the turbocombustion engine showing the simultaneous opening of the cap and the cylinder-valves as the crankshaft is rotating.
Figure 11:
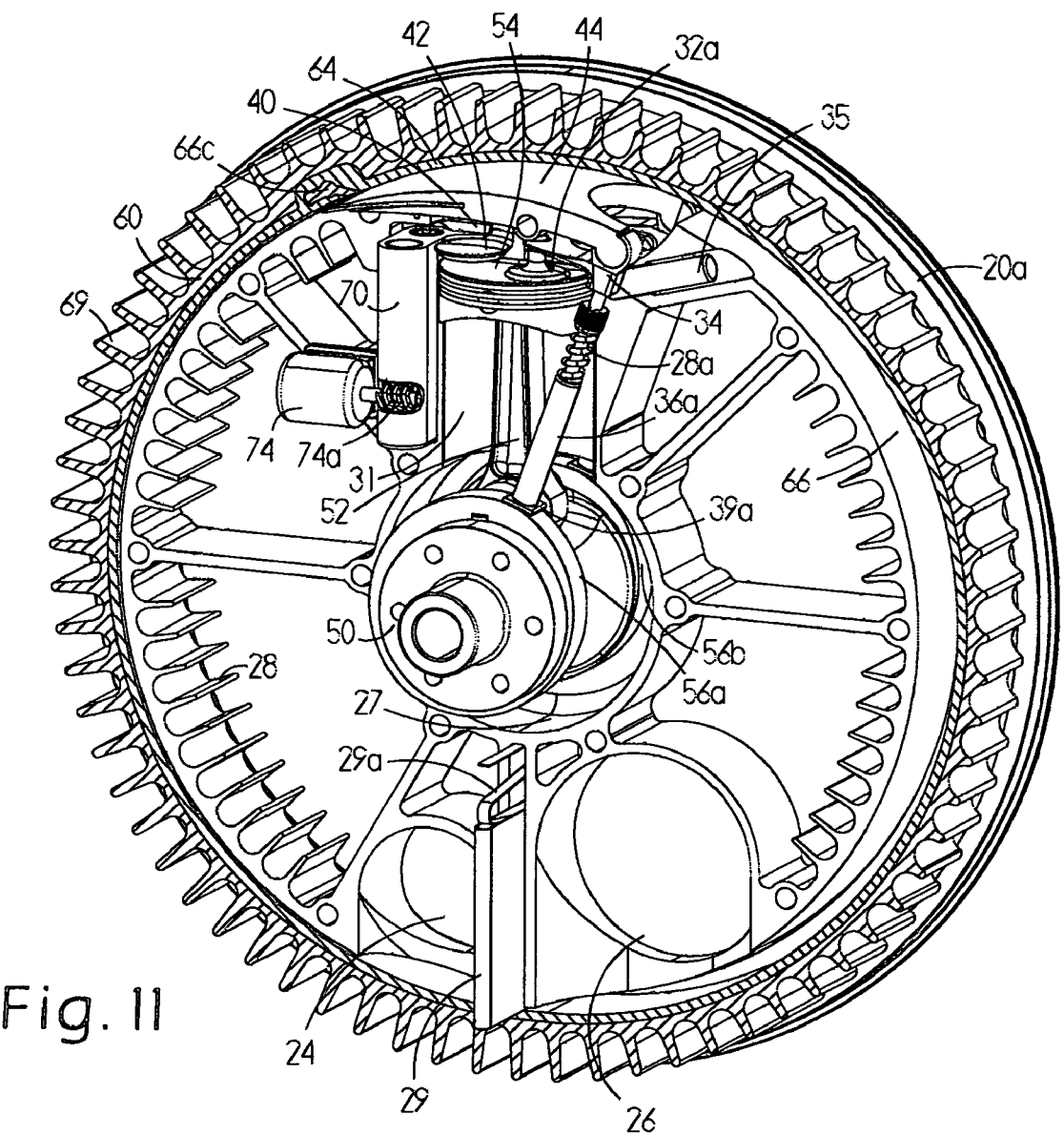
FIG. 11 is a perspective front view of the housing and the sectional view of the rotor and its support with the engine parts in place and a clear illustration of the channel the exhaust port and the intake port.

The Cylinder 30 as shown in FIGS. 4, 6 and 11 furthermore may include a cylinder shell 31 to support said cylinder 30. Said cylinder shell 31 is formed to accommodate and seal all arts and flows in communication with the cylinder 30.

Figure 5C:
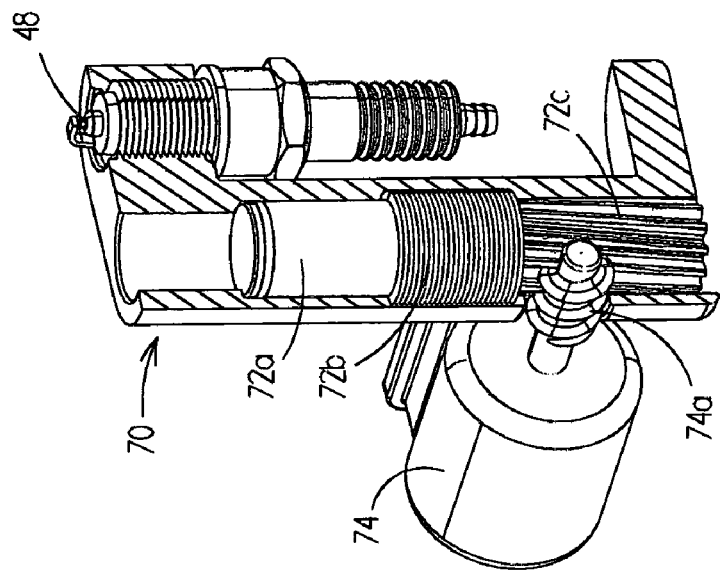
FIGS. 5a, 5b and 5c are perspective and sectional views of the VCR system and a spark plug showing movements of the VCR shaft within the VCR cylinder.
Figure 5B:
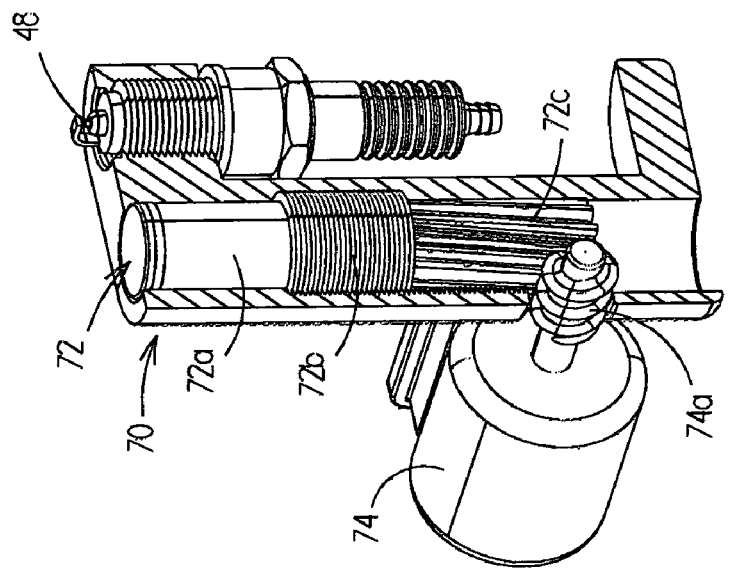

Combustible fuel within the combustion chamber may be ignited under pressure or as shown in FIGS. 5b and 5c the ignition may be assisted by a spark means 48.

Figure 5A:
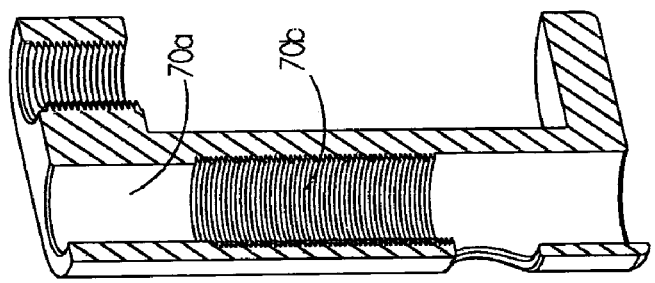

The combustion chamber 40 furthermore may include a variable compression ratio or VCR system 70 to regulate compression within the combustion chamber 40. Said VCR system 70 includes means that increase and decrease the capacity of the combustion chamber 40. Said means as shown in FIGS. 5a, 5b and 5c, may include a VCR shaft 72 and an electric motor 74 that rotates the VCR shaft 72 preferably via a worm gear 74a. Said VCR shaft 72 is formed partially to a VCR piston 72a, partially to a VCR bolt 72b and partially to a VCR gear 72c. Said VCR shaft is to move across a VCR cylinder 70a partially formed to slidably and sealably accommodate said VCR piston 72a and partially formed to a tread means 70b to couple with the VCR bolt 72b.

Movement of said VCR shaft 72 within said VCR cylinder 70a is controlled by a sensor means (not shown) in communication with the combustion chamber 40 and the electric motor 74. Said sensor means is to adjust the capacity of said combustion chamber 40 to ideal compressions require for optimum performance of the engine 10 under all variables at any given time.

The camshafts 36a and 36b as sown in FIGS. 3 and 4 furthermore are to control the pivotal movement of the cap 44 for closing and opening of the combustion chamber 40.

Figure 12:
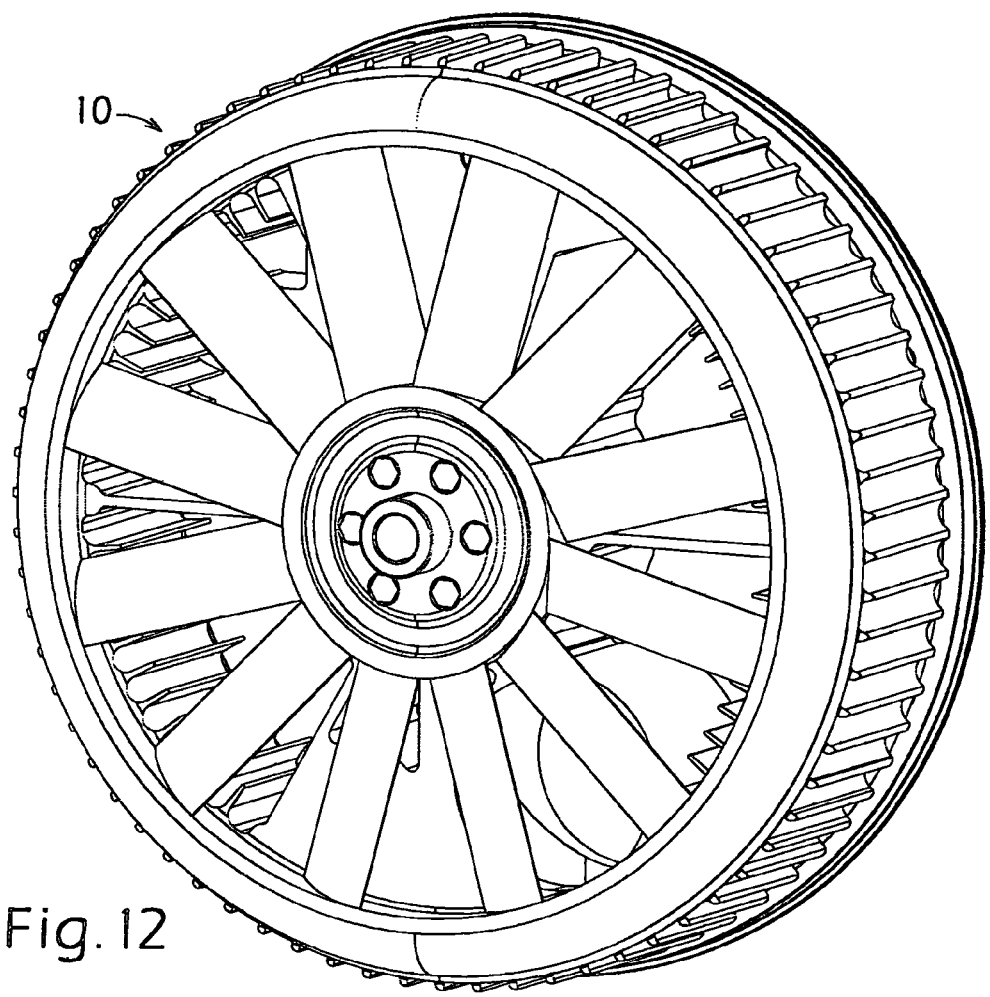
FIG. 12 is a perspective front view of the turbocombustion engine completely assembled.
Figure 13:
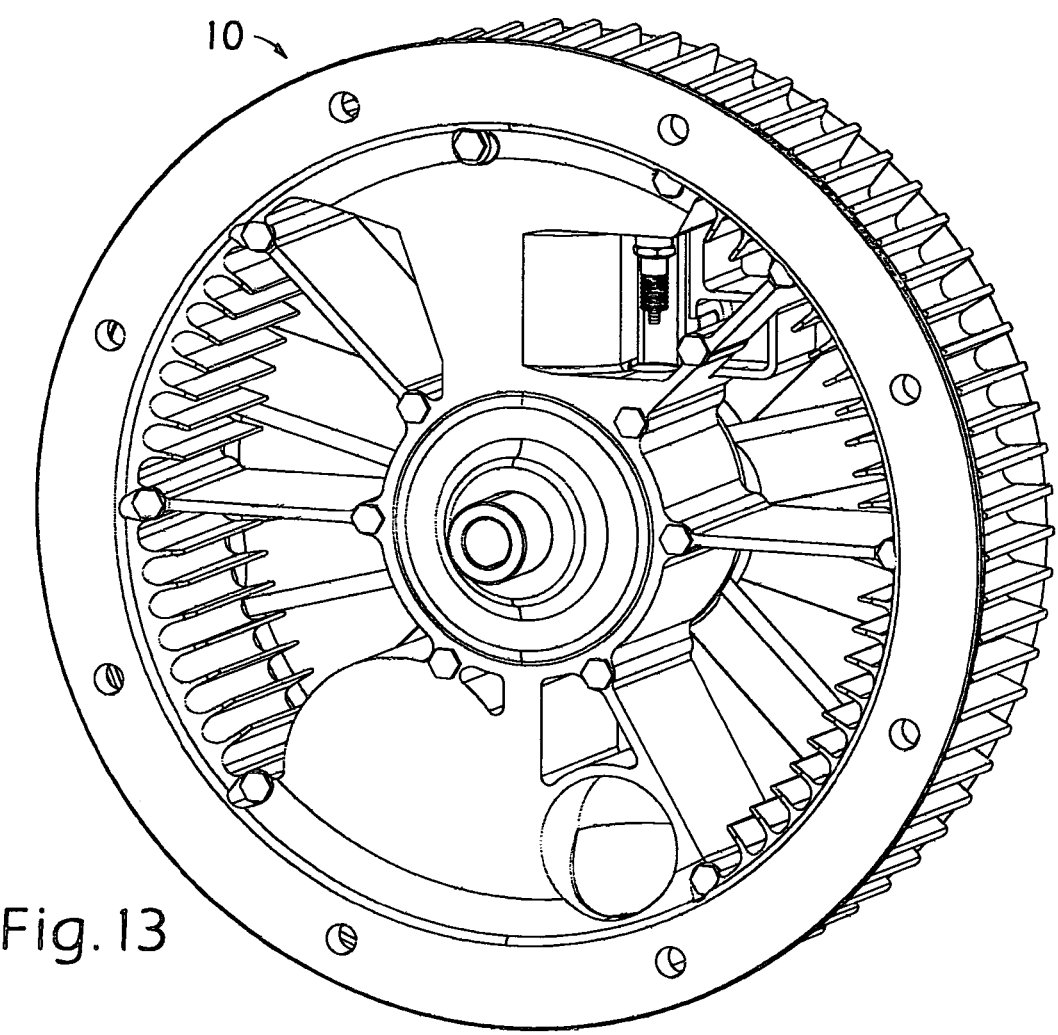
FIG. 13 is a perspective back view of the turbocombustion engine completely assembled.
Figure 15B:
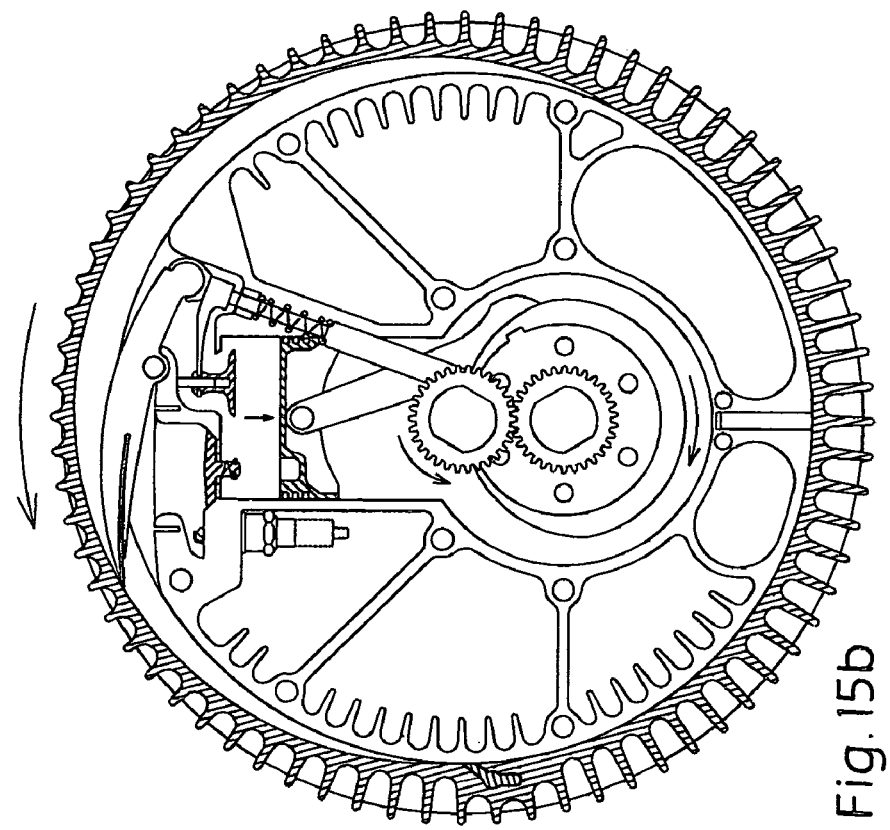
FIGS. 15a and 15b illustrating a turbocombustion engine having a pair of gears connecting the rotor to the crankshaft and the opposite rotation of the two.
Figure 15A:
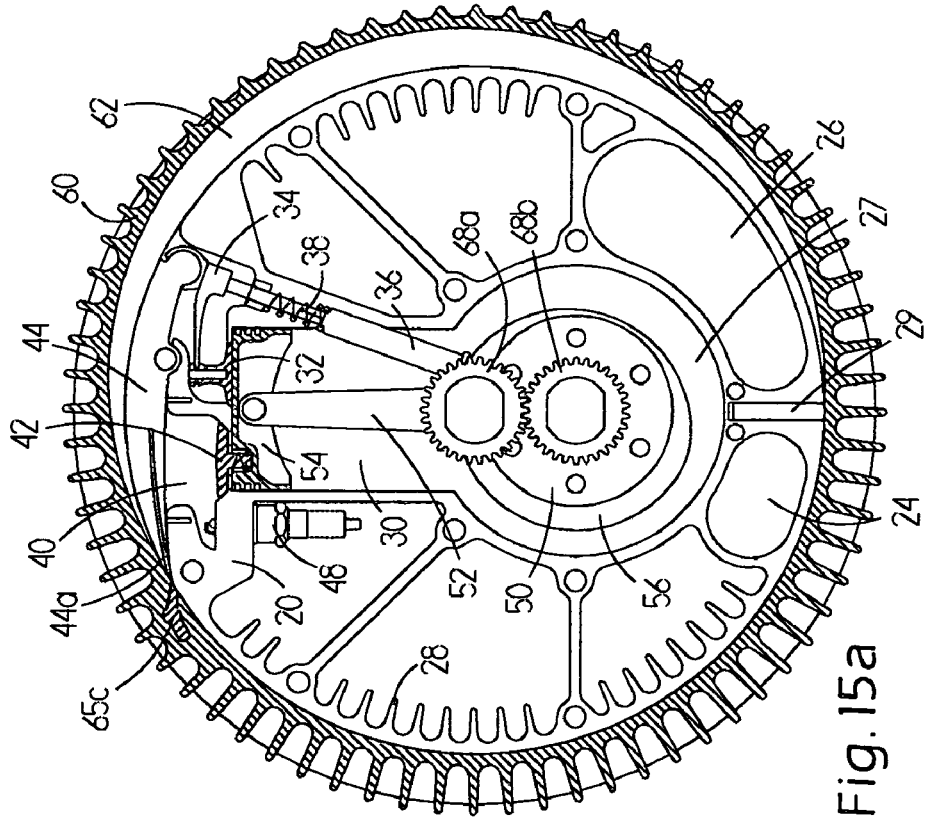

The rotor 60 as shown in FIG. 1 includes a channel 62 of proper geometry that extends nearly to half of the rotor 60 circumference. The rotor 60 as shown in FIG. 12 is either fixedly attached to the crankshaft 50 or formed to rotate at equal rotation with the crankshaft 50 either at the same or opposite direction by a proper means. The Equal rotation of the rotor 60 to the crankshaft 50 at the same direction as shown in FIGS. 16a and 16b may be assisted by a chain drive 67 and at the opposite direction as shown in FIGS. 15a and 15b by a pair of gears 68a and 68b of equal teeth. The rotor 60 as shown in FIGS. 1 and 11 furthermore may include a plurality of paddles 69 to air-cool the rotor 60 and radiating paddles 63 to trust air in a desired direction when said rotor 60 is rotating.

Figure 14B:
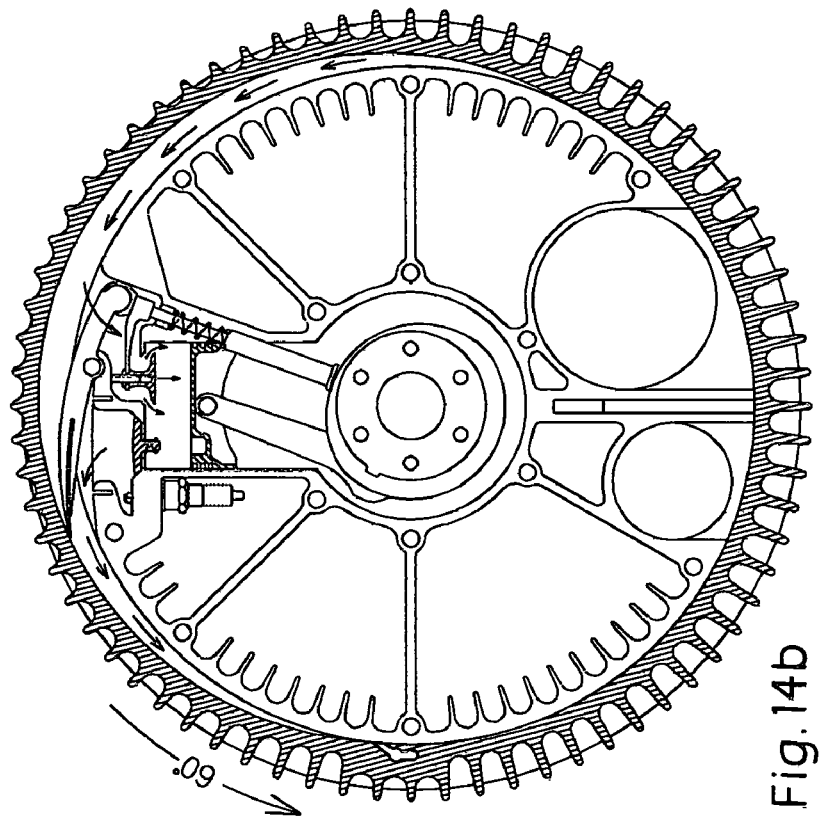
FIGS. 14a, 14b 14c, 14d, 14e and 14f illustrating one full rotation of the rotor, the crankshaft and their relation with other parts of the engine including moving direction of the flows in every 60 degree incremental rotation.
Figure 14A:
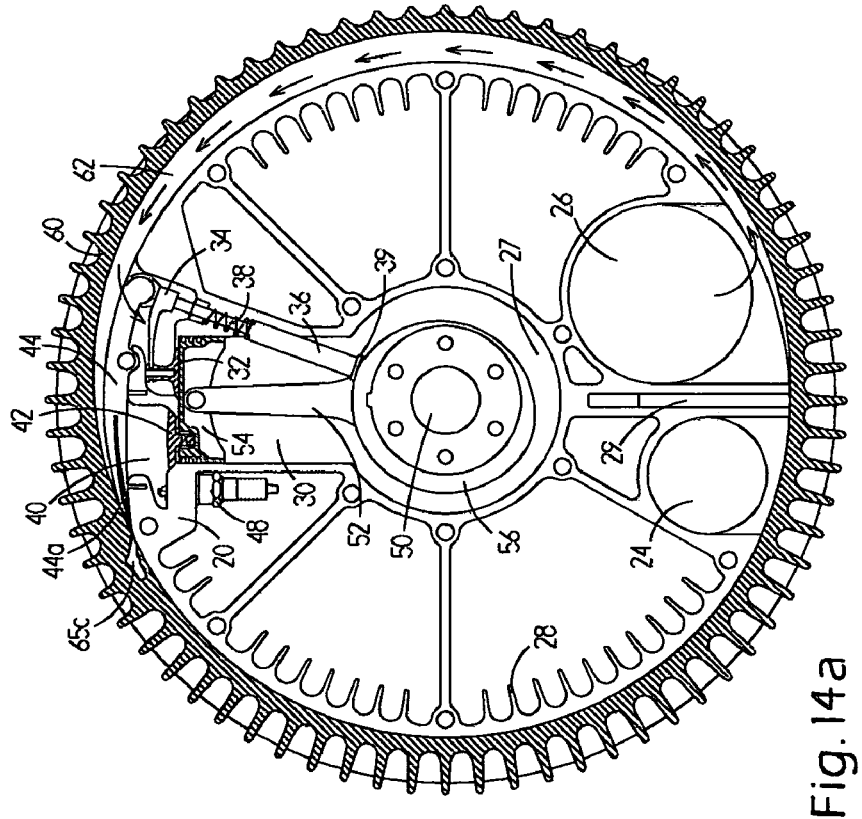
Figure 14D:
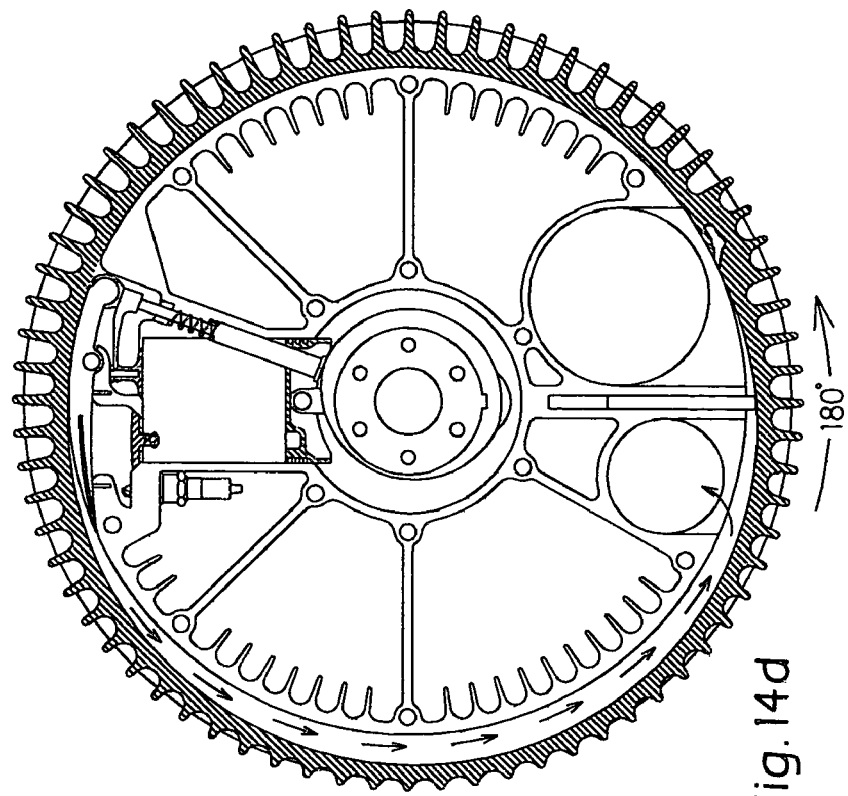
Figure 14C:
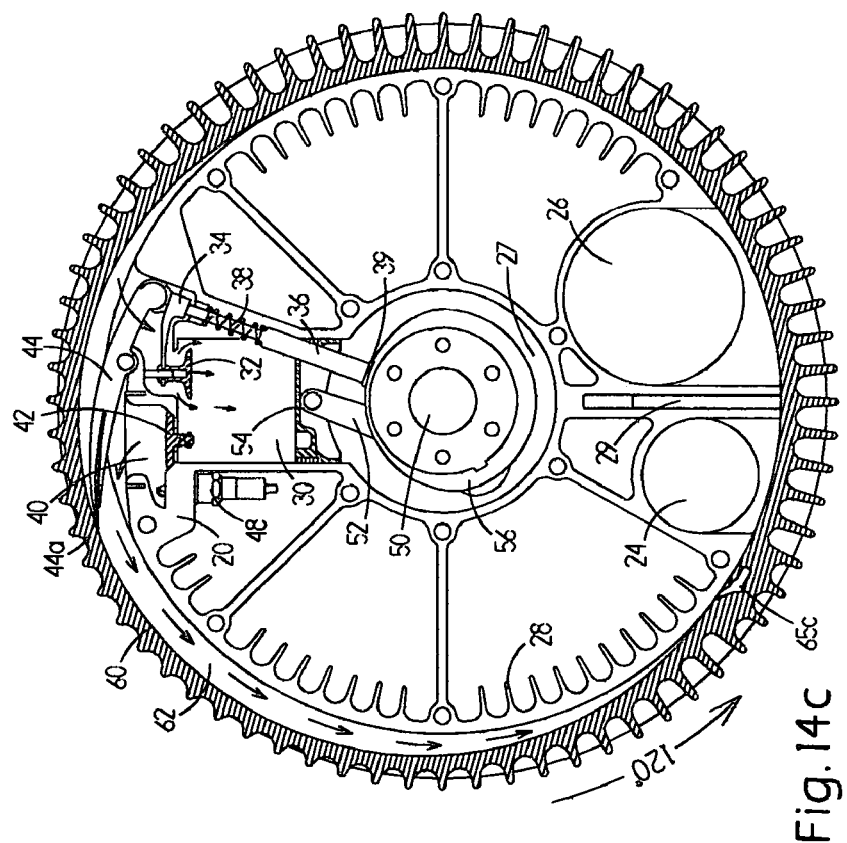

The cap 44 as shown in FIGS. 14b and 14c is in constant communication with the channel 62 during the expansion cycle. In addition to assist closing of the cap 44 over the combustion chamber 40 during the compression cycle, the cams 56a and 56b as shown in FIGS. 3 and 4 are to control the pivotal motion of the cap 44 while in communication with the channel 62 for proper seal and avoid friction. For further adjustments, seal and reduce or eliminate friction between the cap 44 and the channel 62, the cap 44 may include a cap seal 44a slightly projected from the cap 44.

The housing 20 may be made in two or more pieces 20a and 20b to facilitate the construction thereof and ease placement of the parts within said housing 20.

The Turbocombustion engine 10 of the present invention prime function includes four complete cycles consisting of suction, compression, expansion and exhaust in every rotation. The suction and compression cycle occur inside the cylinder 30, the expansion and exhaust cycle occur inside the channel 62. Suction and expansion occurs simultaneously in a near one-half rotation of the rotor 60, compression and exhaust occur simultaneously in the other near one-half rotation of the rotor 60.

At the suction cycle as shown in FIGS. 14b and 14c rotation of the cam 56 in conjunction with forces applied by the expansion springs 38, move the camshafts 36 toward the crankshaft 50 and force the valve support 34 to open the cylinder-valves 32. As the cylinder-valves 32 opens, the channel 62 content shift and sucked into the cylinder 30. Considering the capacity of the channel 62 can be much larger than the capacity of the cylinder 30, said suction and shifting process can create positive compression within the cylinder 30, far superior tan turbo charging prior to the compression cycle.

Figure 14F:
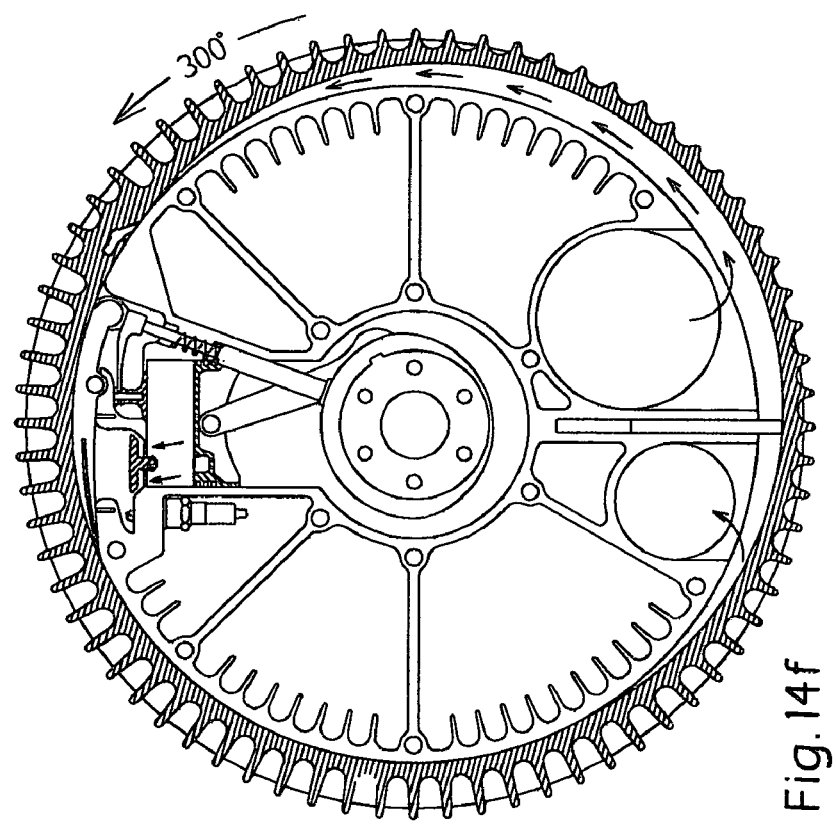
Figure 14E:
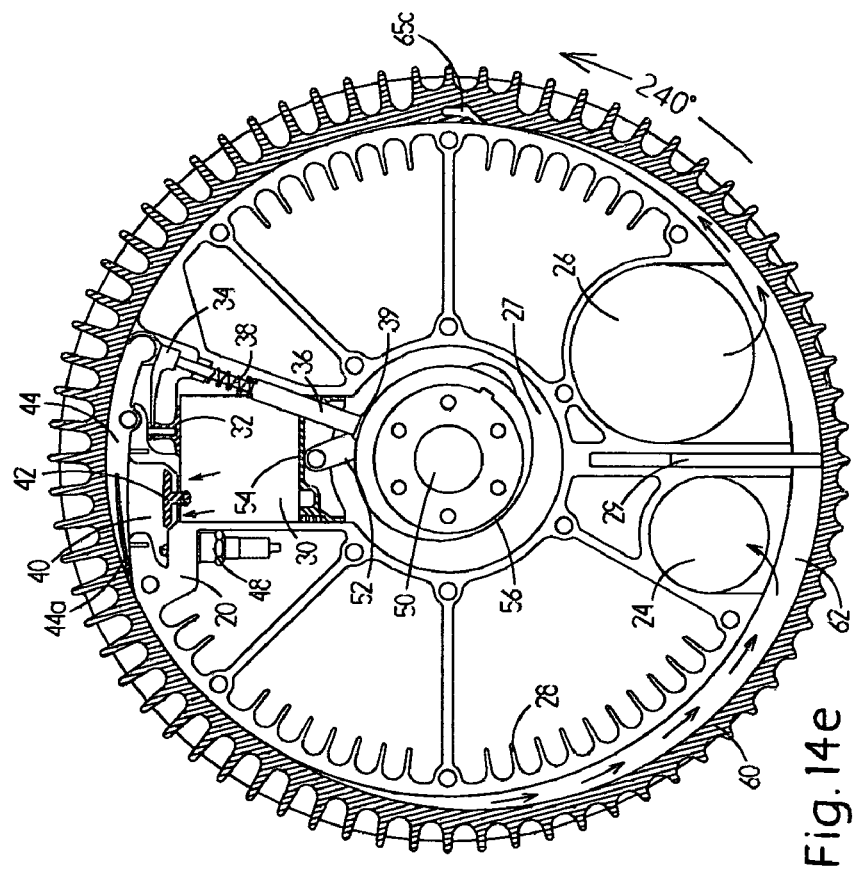

The compression cycle as shown in FIGS. 14e and 14f occurs following the cam 56 closing of the cylinder-valve 32 and the cap 44. Traveling of the piston 54 from the bottom dead center to the top dead center, compress the cylinder 30 content inside the combustion chamber 40. Fuel may be added to the channel 62, the cylinder 30 or the combustion chamber 40 as needed.

The cam 56 as shown in FIGS. 14e and 14f is the force behind keeping the cap 44 closed at the compression cycle. The rotor 60 however as shown in FIGS. 20a and 20b is quite capable of keeping the cap 44 closed during the compression cycle on its own, but eliminating the cam 56 for that matter can cause friction between the rotor 60 and the cap 44.

The expansion cycle as shown in FIGS. 14b and 14c is initiated inside the combustion chamber 40 and continued into the channel 62 by opening of the cap 44 and applying the combustion force directly to the rotor 60 within the channel 62. Said combustion force is applied to the rotor 60 parameter at the direction tangential to its circumference. Continuation of the rotor 60 rotation in conjunction with a partition means 29, force exhaust out of the channel 62 through an exhaust port 24 and draw intake inside the channel 62 through an intake port 26 to repeat the cycle. Said partition means 29 as shown in FIG. 8 include a spring means 29a to urge said partition 29 toward the channel 62 for proper seal.

Figure 20B:
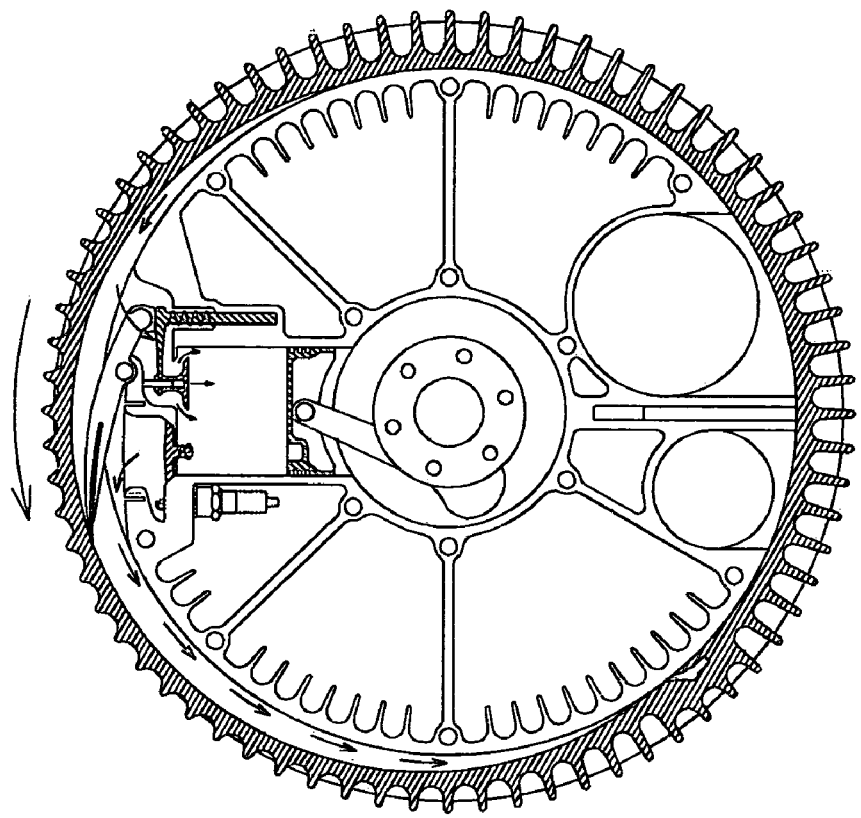
FIGS. 20a and 20b are the illustrations of a Turbocombustion engine absenting the cam and the engaging parts.
Figure 20A:
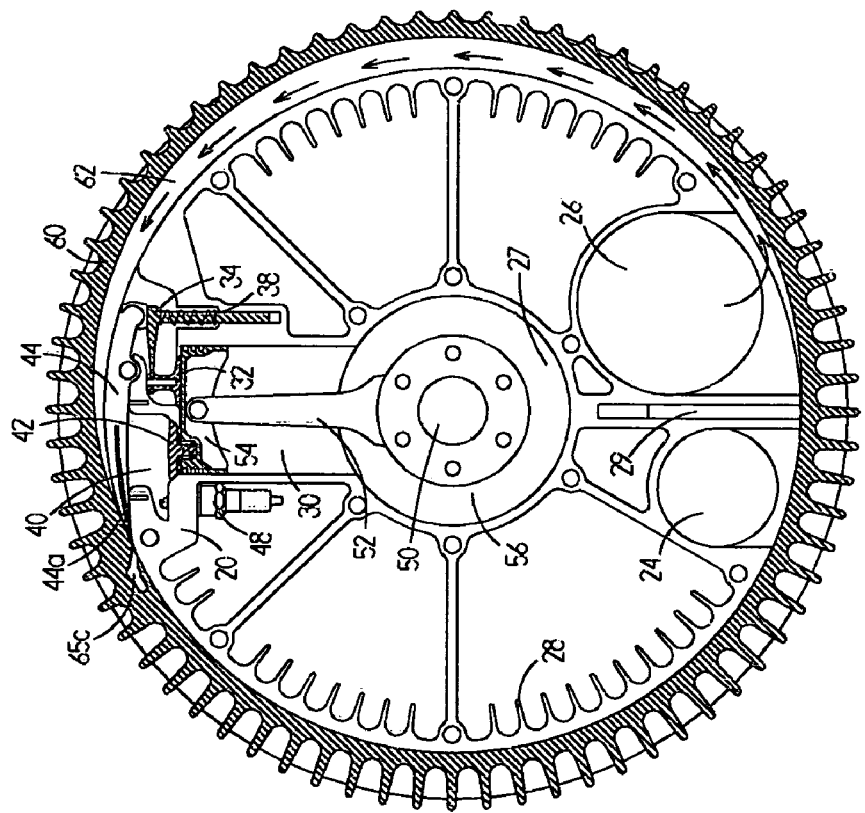

Considering the opening of the cap 44 is driven by the combustion force and its opening is in harmony and simultaneous with the opening of the cylinder valve 32, a proper positioning and connection of the two as shown in FIGS. 20a and 20b can open the cylinder valve 32 simultaneous and in harmony with cap 44 in the absence of the cam 56.

A pair of ring seals 65a and 65b as shown in FIG. 1 are placed each at either sides of the channel 62 to seal the rotor 60 with minimum or no friction and a lateral seal 65c is placed to seal the channel 62 laterally. Said lateral seal 65c maybe formed to seal the cannel 62 using centrifugal force applied to it as the rotor 60 is rotating. To use centrifugal force, said lateral seal 65c as shown in FIG. 17 is formed to a seal portion 65d, a pivoting portion 65e and a weight portion 65f. The pivoting portion 65e is pivotally held in place by the rotor 60, the seal portion 65d is slidably engage the housing 20 or its ring 22 and the weight portion 65f is to urge the seal portion 65d toward the housing 20 or the ring 22 under the influence of centrifugal force applied to said weight portion 65f by the rotation of the rotor 60.

Figure 2:
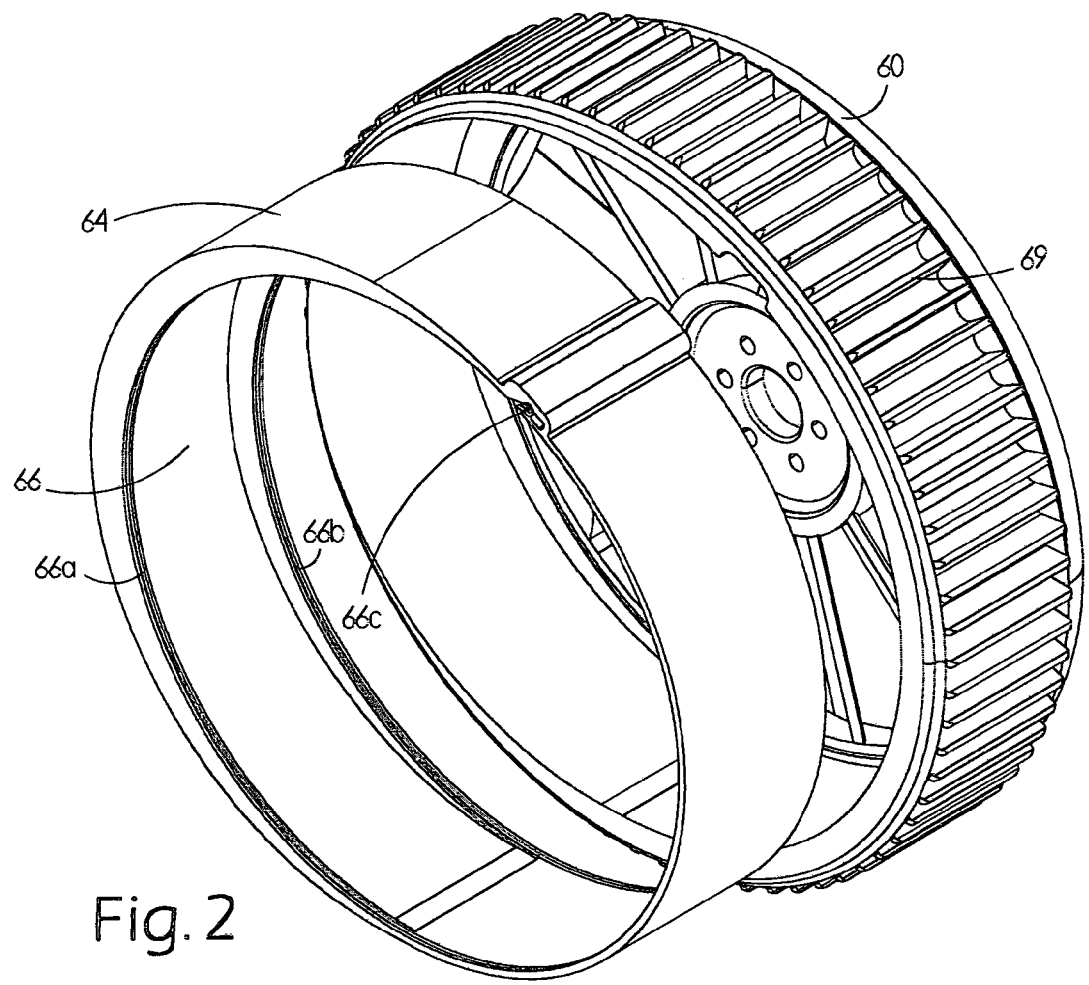
FIG. 2 is a perspective and exploded view of the rotor including the rotor support

For a perfect fit and seal of the cap 44 with minimum or no friction within the channel 62 in case of possible lateral movements or vibration of the rotor 60, said rotor 60 as shown in FIG. 2 may include an independent channel assembly 64 formed to be received by said rotor 60 with slight lateral motion capability. Said rotor support 64 includes a support channel 66, a pair of ring seals 66a and 66b placed each at either sides of said rotor support 64 and a lateral seal 66c to seal the support channel 66 laterally.

Figure 19:
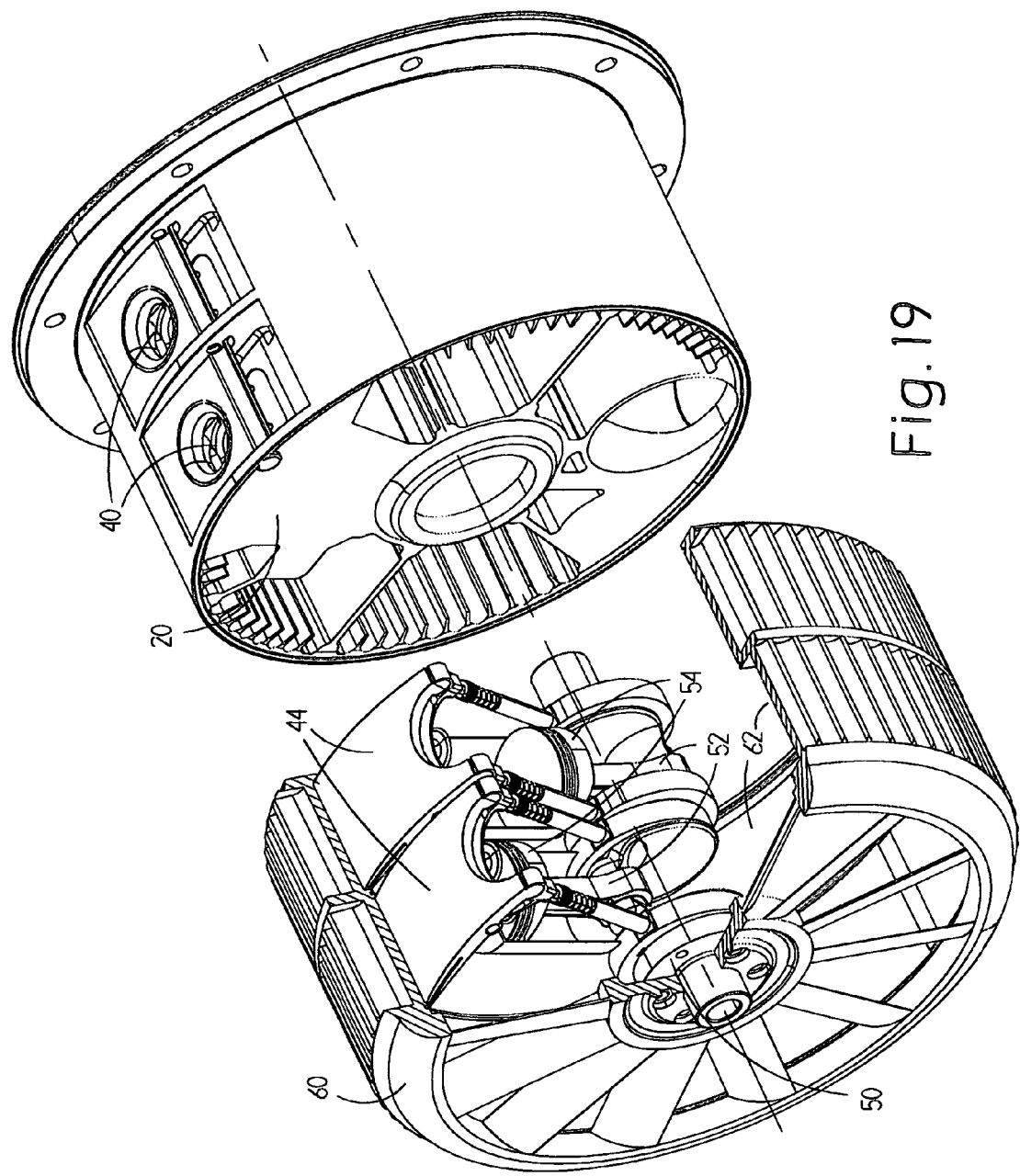
FIG. 19 is a perspective partially sectional and exploded view of a multi unit Turbocombustion engine having a multi channel rotor.

A Turbocombustion engine as shown in FIG. 19 may have multiple units each within the scope and principles of the present invention. One common rotor 75 having adequate channels and one common crankshaft 76 with adequate cranks placed in proper positions can serve a multi units Turbocombustion engine.

What I claim is:

1. A turbocombustion engine, comprising:
    a non-rotational housing having a combustion chamber, and means for compressing air, fuel, or air-fuel mixture to the combustion chamber, the compressing means being separated from the combustion chamber;
    a rotor disposed to an exterior of said housing and placed to rotate coaxially around the exterior of said housing; and
    means for allowing a combustion force generated from the combustion chamber to cause the rotor to rotate coaxially around the exterior of said housing.

2. The turbocombustion engine of claim 1 wherein the compressing means is driven by the rotor.

3. The turbocombustion engine of claim 1 wherein the means for allowing a combustion force to the rotor to rotate coaxially around the exterior of said housing comprises means for sealing the combustion chamber when the compressor is delivering air, fuel, or air-fuel mixture to the combustion chamber and opening the combustion chamber to allow the combustion force to rotate the rotor.

4. The turbocombustion engine of claim 1 wherein the rotor includes means for delivering air, fuel, or air-fuel mixture to the compressing means at the same time the combustion force is applied to the rotor to rotate coaxially around the exterior of said housing.

5. The turbocombustion engine of claim 1 wherein the rotor includes means for outputting exhaust from the combustion chamber as delivering air, fuel, or air-fuel mixture to the combustion chamber.

6. The turbocombustion engine of claim 1 further comprising means for adjusting the capacity of the combustion chamber to vary the compression ratio.

7. The turbocombustion engine of claim 1 further comprising means for cooling the turbocombustion engine.

8. A turbocombustion engine comprising;
    a housing,
        wherein the housing is non-rotational and comprising a combustion chamber, and a compressor being separated from the combustion chamber, the compressor being configured to deliver air, fuel, or air-fuel mixture to the combustion chamber; and
    a rotor being to accommodate said housing and rotate coaxially around the exterior of said housing,
        wherein said rotor is arranged with the combustion chamber so that a combustion force generated from the combustion chamber causes the rotor to rotate coaxially around the exterior of said housing.

9. The turbocombustion engine of claim 8
    wherein the compressor is configured to deliver air to the combustion chamber, and the combustion chamber is configured to receive fuel.

10. The turbocombustion engine of claim 8 wherein the compressor comprises a cylinder, a piston, a connecting rod and a crankshaft driven by the rotor, the crankshaft being configured to move the piston in the cylinder to deliver air, fuel, or air-fuel mixture to the combustion chamber.

11. The turbocombustion engine of claim 10 wherein the cylinder is further configured to receive air, fuel or air-fuel mixture, the piston being configured to deliver the cylinder content to the combustion chamber.

12. The turbocombustion engine of claim 11 further comprising a first gear position to rotate with the rotor, a second gear positioned to rotate with the crankshaft, and the first and the second gear are relatively engaged.

13. The turbocombustion engine of claim 11 further comprising a chain, the axle of the crankshaft, and the axle of the rotor are relatively engaged by said chain.

14. The turbocombustion engine of claim 8 further comprising a cap that closes to seal the combustion chamber when the compressor is delivering air, fuel, or air-fuel mixture to the combustion chamber, and opens to allow the combustion force to rotate the rotor coaxially around the exterior of said housing.

15. The turbocombustion engine of claim 14 wherein the cap is opened by the combustion force generated in the combustion chamber and closed by the rotation of the rotor coaxially rotates around the exterior of said housing.

16. The turbocombustion engine of claim 14 wherein the compressor includes a cylinder valve that allows one-way flow of air, fuel, or air-fuel mixture into the compressor during the combustion in the combustion chamber.

17. The turbocombustion engine of claim 16 wherein a cylinder valve is controlled by the cap to allow one-way flow of air, fuel, or air-fuel mixture into the compressor.

18. The turbocombustion engine of claim 16 further comprises a valve support, wherein said valve support is controlled by the cap and positioned to open and close the valve.

19. The turbocombustion engine of claim 18 wherein the valve support is spring loaded.

20. The turbocombustion engine of claim 14 wherein the compressor comprises a crankshaft driven by the rotor, and a cam engaged with the crankshaft, wherein the cam is being configured to control the cap.

21. The turbocombustion engine of claim 20 wherein the compressor includes a cylinder valve that allows one way flow of air, fuel or air-fuel mixture into the compressor during combustion in the combustion chamber, the cylinder valve being controlled by the cam.

22. The turbocombustion engine of claim 21 further comprising a camshaft, the cap and the cylinder valve being controlled by the cam through the camshaft.

23. The turbocombustion engine of claim 8 wherein the rotor includes a channel configured to receive air, fuel or air-fuel mixture and deliver to the compressor as the combustion force is applied to the rotor.

24. The turbocombustion engine of claim 23 wherein the channel is further configured to receive air, fuel or air-fuel mixture the compressor being configured to deliver air, fuel, or air-fuel mixture to the combustion chamber.

25. The turbocombustion engine of claim 23 wherein the compressor comprises a cylinder and a piston configured to move in the cylinder to deliver air, fuel, or air-fuel mixture to the combustion chamber, the capacity of the channel being grater than the capacity of the cylinder.

26. The turbocombustion engine of claim 8 wherein the rotor includes a channel configured to output exhaust from the combustion chamber as the compressor is delivering air, fuel or air-fuel mixture to the combustion chamber.

27. The turbocombustion engine of claim 8 wherein the housing includes an intake port that allows one-way flow of air, fuel or air-fuel mixture into the compressor, an exhaust port that allows one-way flow of exhaust output from the combustion chamber, and a partition separating the intake port from the exhaust port.

28. The turbocombustion engine of claim 8 wherein the capacity of the combustion chamber is adjustable to vary the compression ratio.

29. The turbocombustion engine of claim 28 wherein the combustion chamber includes a cylinder having a piston and wherein the capacity of the combustion chamber is adjusted by moving the piston in the cylinder.

30. The turbocombustion engine of claim 8 wherein the rotor includes a channel configured to deliver air, fuel or air-fuel mixture to the compressor, and output exhaust from the combustion chamber, the rotor and channel are separately structured and configured to engage one another.

31. The turbocombustion engine of claim 8 wherein the rotor includes a channel configured to deliver air, fuel or air-fuel mixture to the compressor, and output exhaust from the combustion chamber, and a lateral seal configured to seal the channel using the centrifugal force generated by the rotating rotor.

32. The turbocombustion engine of claim 31 wherein the seal comprises a seal portion configured to slidably engage the housing, a pivoting portion held in place by the rotor, and a weight portion configured to urge the seal portion toward the housing in response to the centrifugal force generated by rotating rotor.

33. The turbocombustion engine of claim 8 wherein the rotor comprises a plurality of paddles to cool the rotor.

34. The turbocombustion engine of claim 8 wherein the housing includes a plurality of paddles to cool the housing.

35. A turbocombustion engine, comprising:
 a plurality of units,
  wherein each of said plurality of units further comprising:
 a non-rotational housing having a combustion chamber and a compressor being separated from the combustion chamber,
  wherein the compressor is configured to deliver air, fuel, or air-fuel mixture to the combustion chamber, and
 a rotor disposed on an outside of said housing to rotate coaxially around the exterior of said housing,
  wherein said rotor is arranged with the combustion chamber of each of the units so that a combustion force generated in the combustion chamber by each of the units causes the rotor to rotate coaxially around the exterior of said housing.

36. A turbocombustion engine comprising:
 a rotor;
 a housing,
  wherein said housing is non-rotational and includes a cylinder, a combustion chamber separate from the cylinder but in communication with said cylinder, an intake port, an exhaust port and a partition separating the intake port from the exhaust port; said housing further is formed to receive the rotor:
 a crankshaft rotatively held in place;
 a connecting rod pivotally attached to said crankshaft;
 a piston pivotally attached to said connecting rod;
  wherein said rotor is formed to accommodate to an exterior of said housing and disposed to rotate coaxially on the exterior of said housing at equal rotation with the crankshaft; and
 a cap pivotally sealed in place to close and open the combustion chamber;
  wherein said rotor includes a channel that extends to near half of its circumference and formed to accommodate the cap;
  wherein said cylinder further includes a cylinder valve to allow one-way flow of the channel content to the cylinder; and
  wherein said combustion chamber further includes a chamber-valve to allow one-way flow of the cylinder content to said combustion chamber.

* * * * *